United States Patent [19]
Hayes et al.

[11] Patent Number: 5,822,385
[45] Date of Patent: *Oct. 13, 1998

[54] FAST SERIAL PATTERN RECOGNITION

[75] Inventors: Paul Malcolm Hayes, Ferndown; Peter Andrew Page, Branksome, both of United Kingdom

[73] Assignee: GPT Limited, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 534,561

[22] Filed: Sep. 27, 1995

[30] Foreign Application Priority Data

Oct. 8, 1994 [GB] United Kingdom ............... 9420307

[51] Int. Cl.$^6$ ...................................................... H04L 7/00
[52] U.S. Cl. .......................................... 375/368; 375/340
[58] Field of Search ................................. 375/340, 342, 375/364, 365, 368; 370/178, 180, 509, 512, 514; 235/462; 364/715.11

[56] References Cited

U.S. PATENT DOCUMENTS

| | | | |
|---|---|---|---|
| 4,016,368 | 4/1977 | Apple, Jr. ................................. | 375/368 |
| 4,524,345 | 6/1985 | Sybel et al. ......................... | 364/715.11 |
| 4,686,690 | 8/1987 | Sato ......................................... | 375/368 |
| 4,691,193 | 9/1987 | Khu ................................... | 340/347 DD |
| 5,018,140 | 5/1991 | Lee et al. ................................. | 370/175 |
| 5,056,119 | 10/1991 | Sakalian et al. ........................ | 375/368 |
| 5,301,195 | 4/1994 | Hasegawa ................................ | 375/368 |
| 5,432,775 | 7/1995 | Crayford ................................. | 375/239 |
| 5,466,921 | 11/1995 | Lapinski et al. ........................ | 235/462 |

*Primary Examiner*—Tesfaldet Bocure
*Attorney, Agent, or Firm*—Kirschstein, et al.

[57] ABSTRACT

In many applications, for example in a telecommunications system, it is necessary to identify a unique data sequence at a high speed serial data interface within one bit period of the complete sequence being received. This pattern recognition is often used in order to synchronize the receiver to the frame timing of an incoming data stream and thus identify the octet boundaries. It is usually required to react to this pattern within one data bit period at the interface in order to synchronize internal counters. A data stream pattern recognition apparatus recognizes a predetermined pattern of sequential data within a data stream by including a state machine having at least as many state units connected in series as there are bits in the predetermined pattern, the state machine transfers sequentially from state to state on receipt of each bit of the series.

1 Claim, 2 Drawing Sheets

FAST SERIAL PATTERN RECOGNITION

BACKGROUND OF THE INVENTION

Field of the Invention

In many applications, for example in a telecommunications system, it is necessary to identify a unique data sequence at a high speed serial data interface within one bit period of the complete sequence being received. This pattern recognition is often used in order to synchronise the receiver to the frame timing of an incoming data stream and thus identify the octet boundaries. It is usually required to react to this pattern within one data bit period at the interface in order to synchronise internal counters. A number of prior art solutions may be considered including using serial to parallel convertors and decoding the resultant "parallelised" data to identify the required bit pattern. However, the conversion and the subsequent decoding will often have serious timing problems that prevent the pattern being recognised within the desired time period.

As an example, for a 16 bit pattern, the state machine could be implemented as a 4 bit counter in which each count value represents a state requiring decodes of the count value to determine the current state and to determine the next state. Unfortunately all decodes take time, and with fast interfaces sufficient time is not available for this decode.

The proposed solution below has the merit of being fast and easily changed to recognise other patterns or, indeed, patterns of different lengths.

SUMMARY OF THE INVENTION

According to the present invention there is provided a data stream pattern recognition apparatus for recognising a predetermined pattern of sequential data within a data stream the apparatus comprising a state machine having at least as many state units connected in series as there are bits in the predetermined pattern, wherein on receipt of a data stream having a series of consecutive bits of the predetermined pattern, the state machine transfers sequentially from state to state on receipt of each bit of the series.

BRIEF DESCRIPTION OF THE DRAWINGS

The present invention will now be described, by way of example, with reference to the accompanying figures in which.

DETAILED DESCRIPTION OF THE PREFERRED EMBODIMENTS

The solution involves the implementation of a state machine which can change state for each serial data bit received.

When looking for a serial bit pattern the state machine monitors the incoming data for the first bit value expected (1 or 0). If this is received the state machine monitors the incoming line for the next data value expected (1 or 0). If the next bit is as expected the state machine moves to the next state and so on. If the value is not as expected the state machine moves back to an earlier state which may not necessarily be the very first state (this is dependent on the pattern expected).

The solution is to implement the state machine as a "one shot" form of state machine using individual storage elements to represent each state, that is there are 16 elements for a 16 bit pattern. This means that there is no decode required for the state, the only decoding required is to determine the value of the input data and the next state to be achieved.

Figure 1:
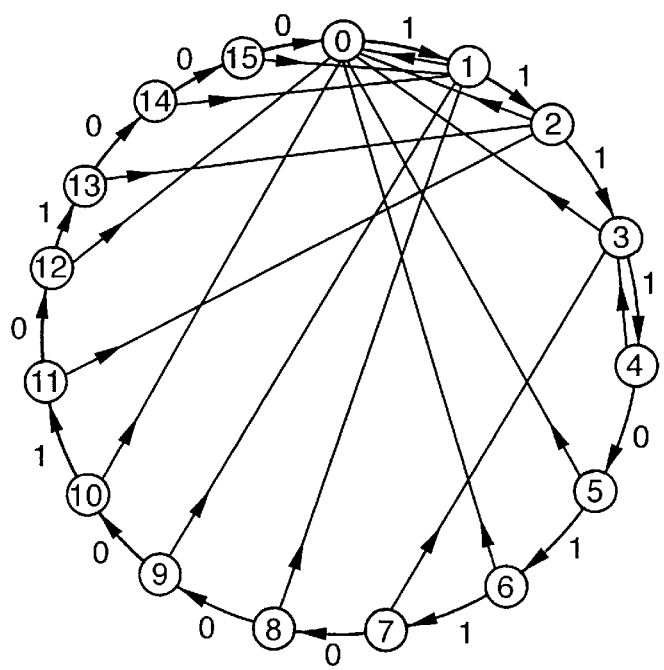
FIG. 1 shows a diagrammatic representation of the sequence of operations followed by a State Machine according to the present invention.

FIG. 1 illustrates such a state machine which is looking for the serial pattern 1111011000101000.

The numerals 0 to 15 around the circumference of FIG. 1 represent the sequence numbers of the states and the arrows around the circumference represent the transitions from a first state to a second state which occurs when a correct bit is received at the first state. The numerals 0, 1 between the states represent the bit which should be received to cause the transition from the first to the second state.

The arrowed chords represent the paths to states which provide a possible sub-sequence where the next bit received is an incorrect bit for the correct transition.

Data bits received up to the point at which the incorrect data value was observed may represent data other than the expected pattern, but it is possible that some of the bits received preceding the failure may match part of the required pattern. For each bit check failure, all preceding bits are assessed to see if they match earlier portions of the expected pattern, starting with the first bit of that pattern. Thus, in the example if the pattern was 11110111, failing at state 7, it is recognised that the preceding 4 bits contain the value 111 preceded by a zero. The 111 could be the start of a new expected pattern. The fact that 11110 was received prior to this is ignored, and since 111 has been received it is used to initiate a re-start from state 3 in the state machine. Therefore, in this case, the state machine goes to state 3 to check if the next bit will also be a 1.

A transition between state 15 and 0 can only be the result of a correct pattern being received, so this transition can be used to trigger a flag that indicates that the correct pattern has been received.

Figure 2:
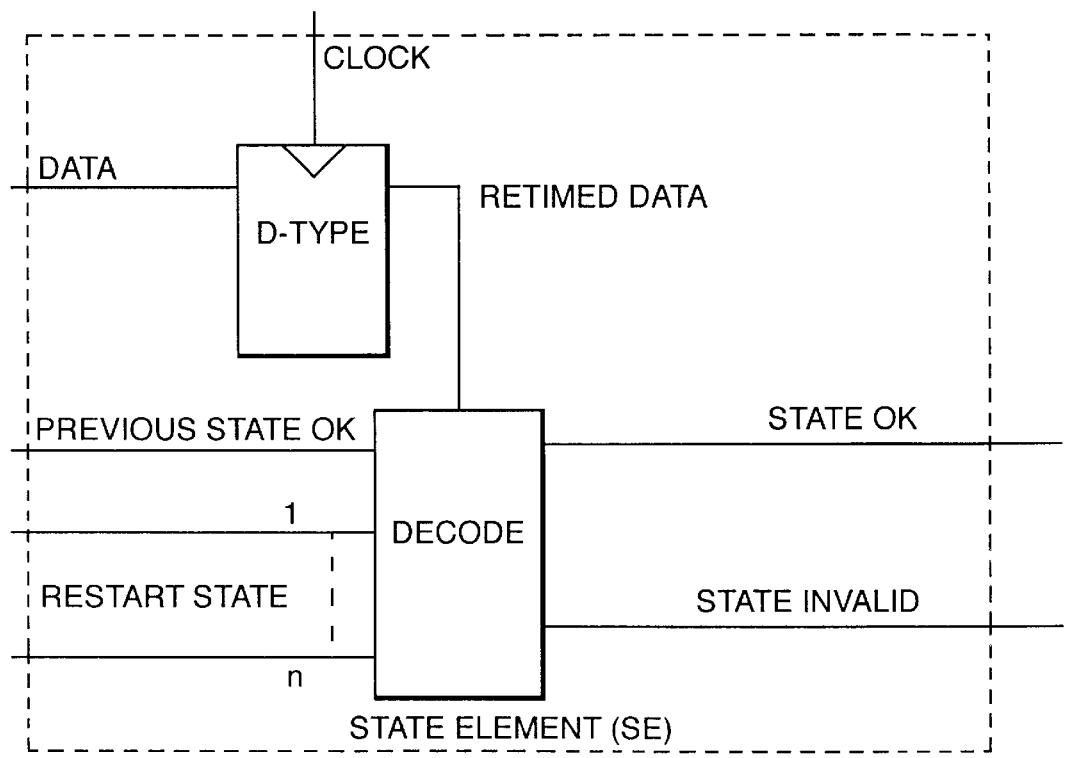
FIG. 2 shows a State Element used in the state machine of FIG. 1.
Figure 3:
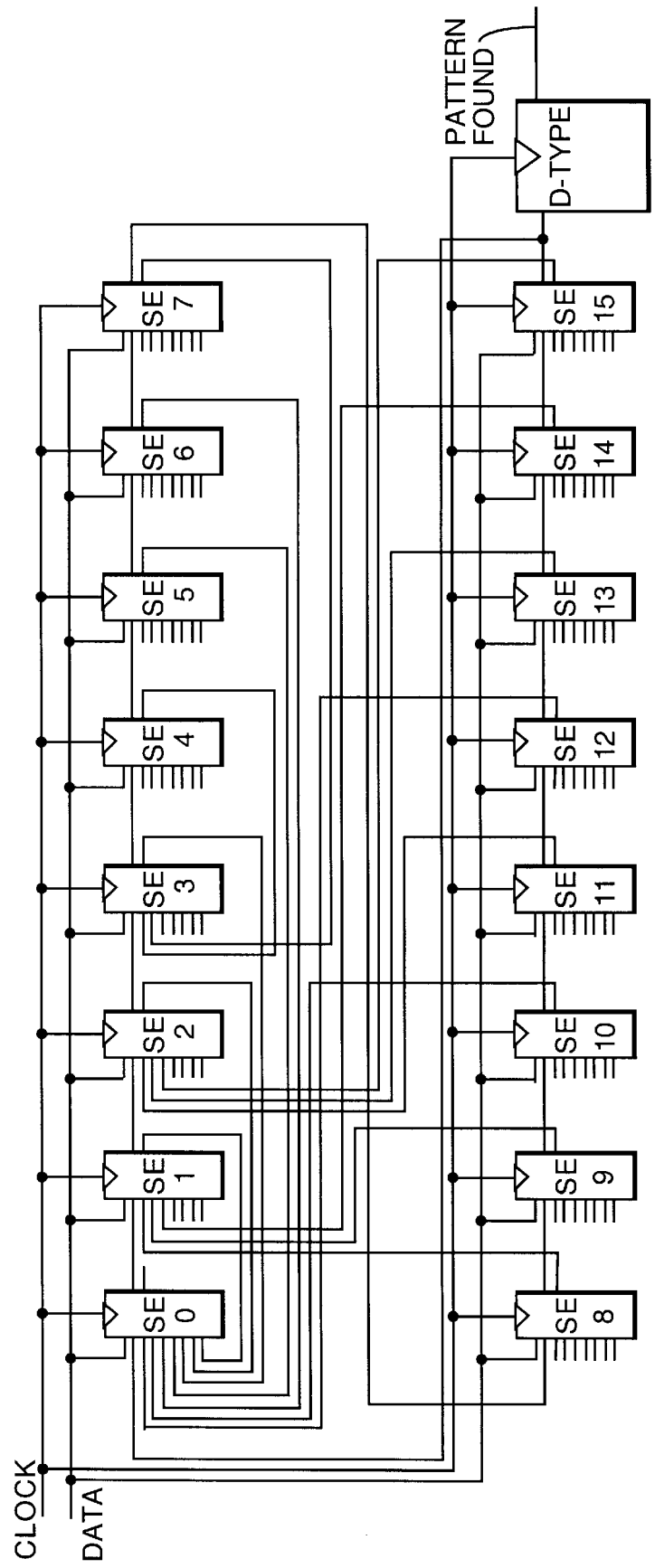
FIG. 3 shows a diagrammatic view of the State Elements of FIG. 2 connected to form the State Machine of FIG. 1.

Considering FIGS. 2 and 3, the state element (SE) works thus:

The decode function compares the retimed data received with the value expected for this state. If the value is matched then it indicates that the check was positive (state OK). The state OK condition can only last for one clock period as data is only valid for one clock period. If the value is not matched then an "enabling pulse" (state invalid) of one clock period is made available and can be used to "re-start" any previous state. The decode function operates under two conditions.

a. The previous state is currently OK p1 b. One of the other states is indicating an invalid state (re-start state). Note that it is only possible for one State OK condition or one re-start condition to occur for any given clock period.

The final SE state is retimed using a D-type, and is a pulse of width of 1 clock period, starting from the end of the last bit of the pattern to be checked.

The requisite number of state elements (SE) are connected as shown in FIG. 3, each having the clock and the data stream connected to the appropriate inputs.

The "state OK" and "state invalid" signals are connected to the "restart state" inputs as shown in FIG. 1 to initiate the correct sequence of transitions.

What we claim is:

1. A data stream pattern recognition apparatus for recognizing a predetermined pattern of bits of sequential data within a data stream, the apparatus comprising: a state machine having at least as many state units connected in series as there are bits in the predetermined pattern; said state machine being operative, on receipt of a data stream having a series of consecutive bits of the predetermined pattern, for sequentially transferring from state to state on receipt of each bit of the series; and said state machine being further operative, on receipt within the data stream of a bit which is not the next valid bit in the predetermined pattern, for transferring to an earlier state, said earlier state being determined by a valid sequence of bits including at least the bit which is not the next valid bit and the immediately preceding bit or bits.

* * * * *